(12) United States Patent
Prest

(10) Patent No.: US 7,926,768 B2
(45) Date of Patent: Apr. 19, 2011

(54) INCLINED SUPPORT FOR A DRAIN HOSE

(75) Inventor: J. David Prest, Tempe, AZ (US)

(73) Assignee: Prest-O-Fit Manufacturing, Inc., Tempe, AZ (US)

( * ) Notice: Subject to any disclaimer, the term of this patent is extended or adjusted under 35 U.S.C. 154(b) by 198 days.

(21) Appl. No.: 11/371,421

(22) Filed: Mar. 9, 2006

(65) Prior Publication Data

US 2007/0210215 A1    Sep. 13, 2007

(51) Int. Cl.
 *A47G 29/00*    (2006.01)
(52) U.S. Cl. ............... 248/80; 248/83; 248/75; 138/106
(58) Field of Classification Search .............. 248/80, 248/75, 83, 76, 49, 127, 166, 431; 138/106; 285/404; 294/16, 170
See application file for complete search history.

(56) References Cited

U.S. PATENT DOCUMENTS

| | | | | |
|---|---|---|---|---|
| 3,819,137 A * | 6/1974 | Smith | ............................. | 248/49 |
| 4,403,758 A * | 9/1983 | Burt | ............................. | 248/49 |
| 4,715,570 A * | 12/1987 | Mashuda | ........................ | 248/49 |
| 5,033,702 A * | 7/1991 | Robbins | ........................ | 248/83 |
| 5,067,679 A * | 11/1991 | Courtney | ....................... | 248/75 |
| 5,322,250 A * | 6/1994 | Wilhite, Jr. | .................... | 248/166 |
| 5,417,460 A | 5/1995 | Lunder | ......................... | 285/253 |
| 5,788,193 A * | 8/1998 | Hilbert | .......................... | 248/80 |
| 6,003,819 A * | 12/1999 | Hall | ................................ | 248/49 |
| 6,619,596 B1 * | 9/2003 | Caine et al. | .................... | 248/49 |

OTHER PUBLICATIONS

"Rite-Drain", 1988 Camping World Summer Sale Catalog, first and last pages and p. 29.
"Rite-Drain", "Slunky", "Compact and lightweight hose support" 1990 Camping World Catalog, first and last pages and pp. 73-75.

\* cited by examiner

*Primary Examiner* — Terrell Mckinnon
*Assistant Examiner* — Todd M. Epps
(74) *Attorney, Agent, or Firm* — The von Hellens Law Firm, Ltd.

(57) ABSTRACT

An inclined support system for a drain hose enhances drainage of wastewater from a holding tank of a recreational vehicle to a disposal facility. The support system includes one or more sawhorse-like fixtures with legs having slanted lower edges in contact with the ground to provide an inclined drain hose supporting cross member. The legs pivot about the cross member and upon insertion of the drain hose intermediate the legs above the cross member, the upper ends of the legs bear thereagainst to define and stabilize the cant or splay of the legs. Upon removal of the hose, the elements of the fixture are foldable to a compact flattened configuration for storage. In another embodiment, one or more slotted cylindrical elements serve as a support for the drain hose. A plurality of pairs of descending length legs are detachably attachable within opposed channels depending from the support to place the support at an incline and enhance the flow of fluid through the drain hose. The support also serves as a storage unit for the drain hose when the drain hose is in its longitudinally compressed state.

7 Claims, 5 Drawing Sheets

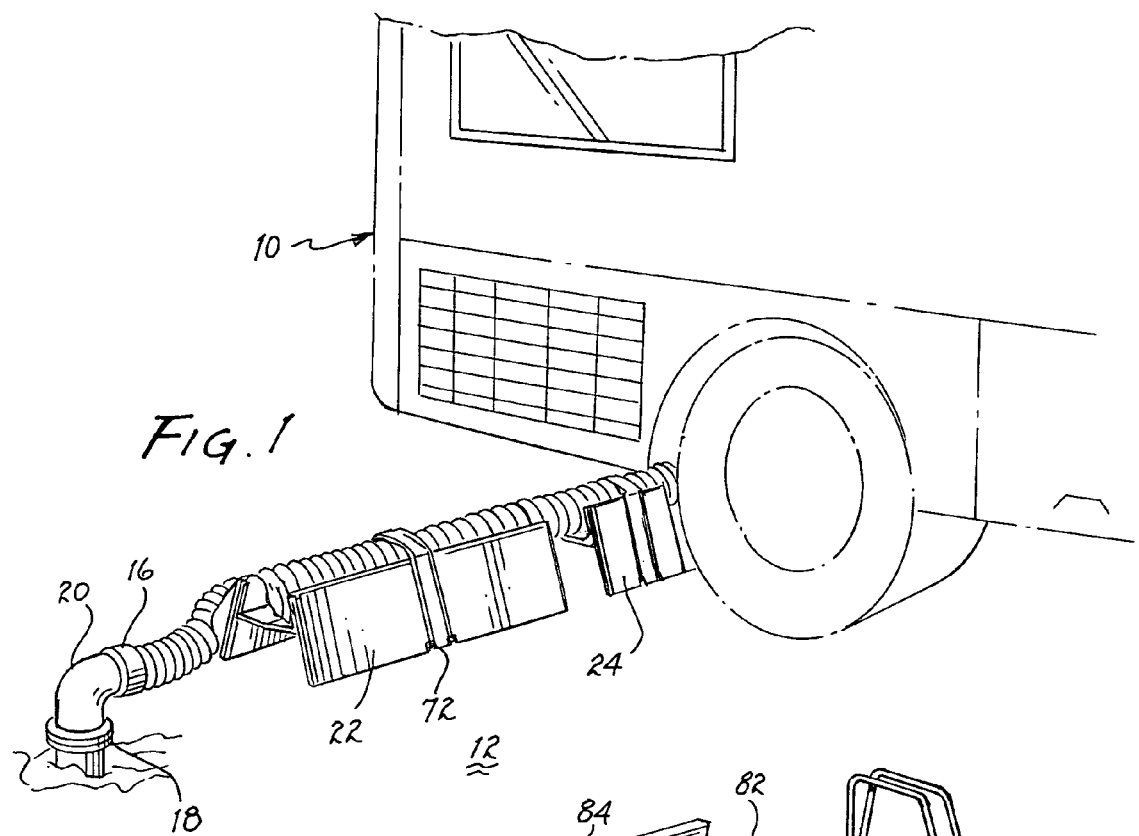
FIG. 1
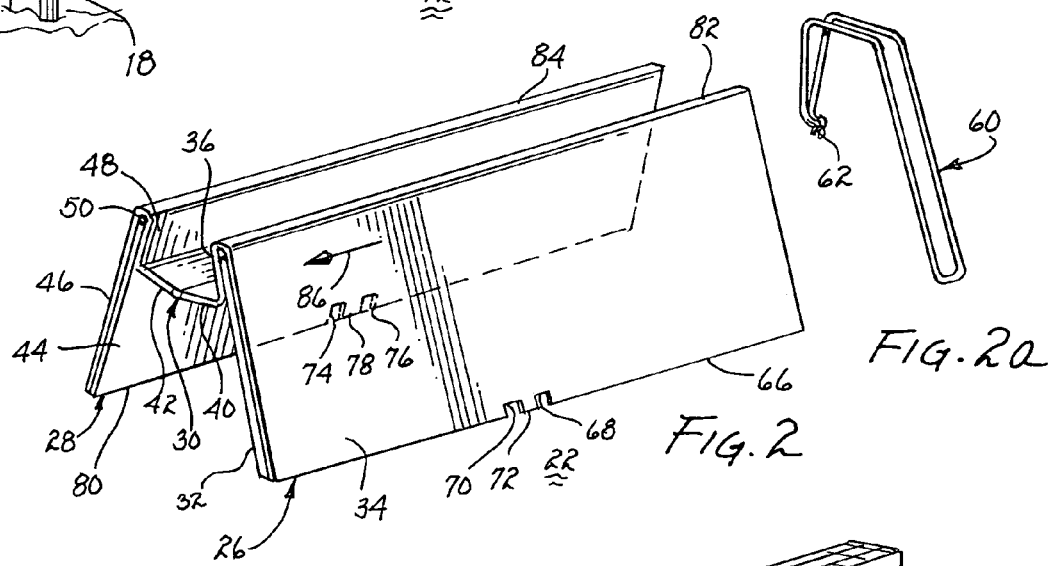
FIG. 2a
FIG. 2
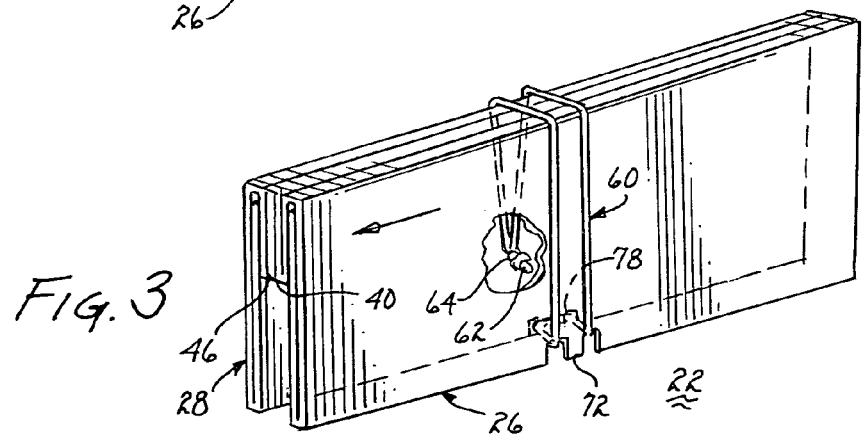
FIG. 3

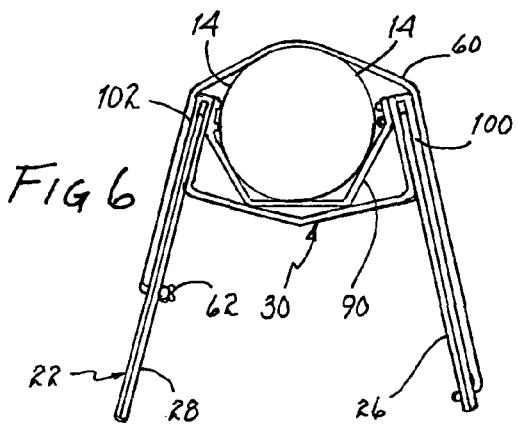
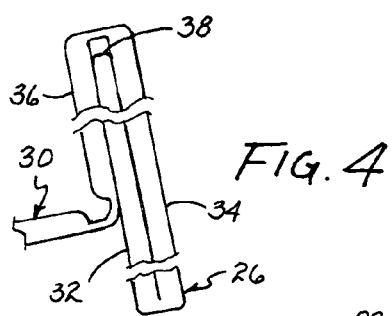
FIG. 6
FIG. 4
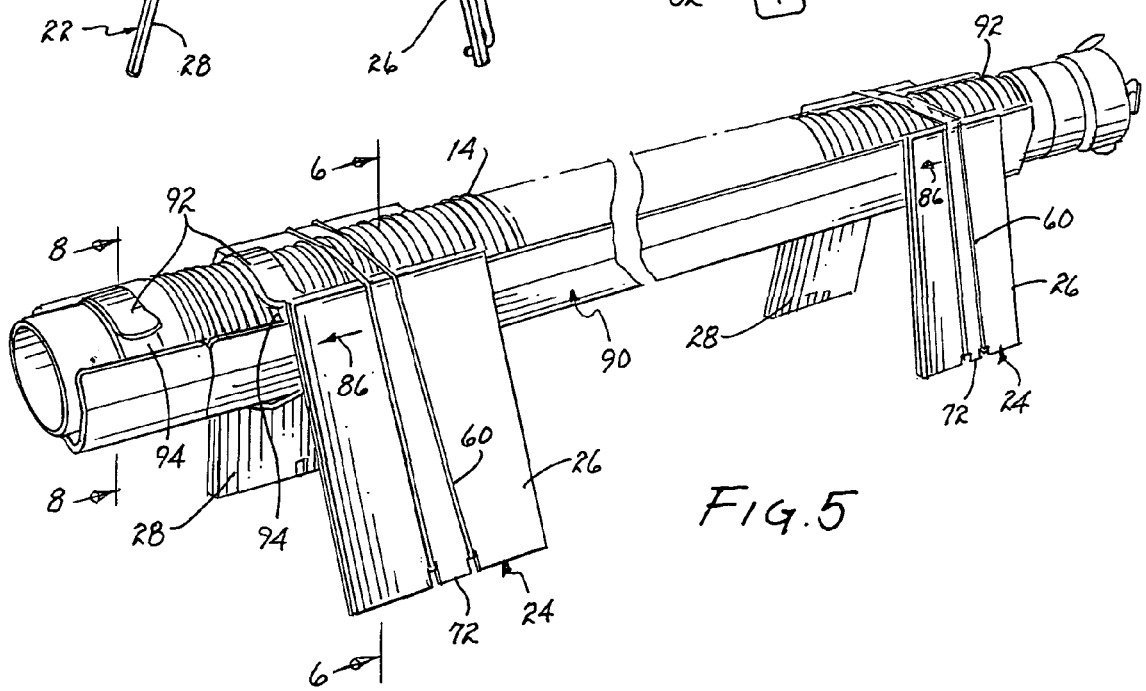
FIG. 5
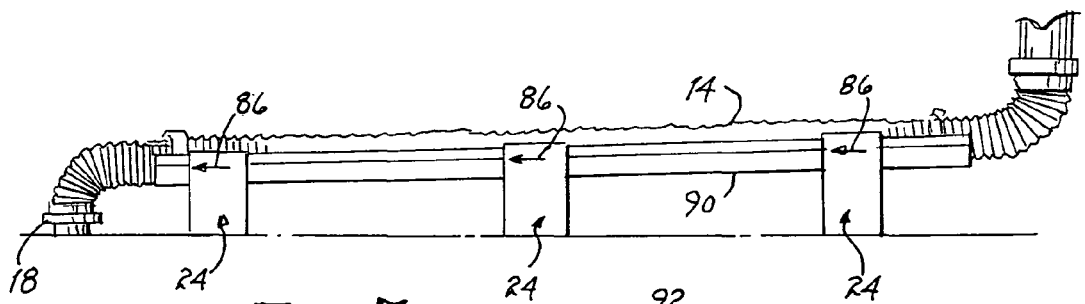
FIG. 7
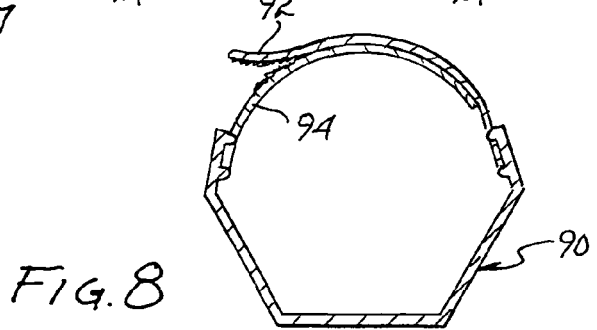
FIG. 8

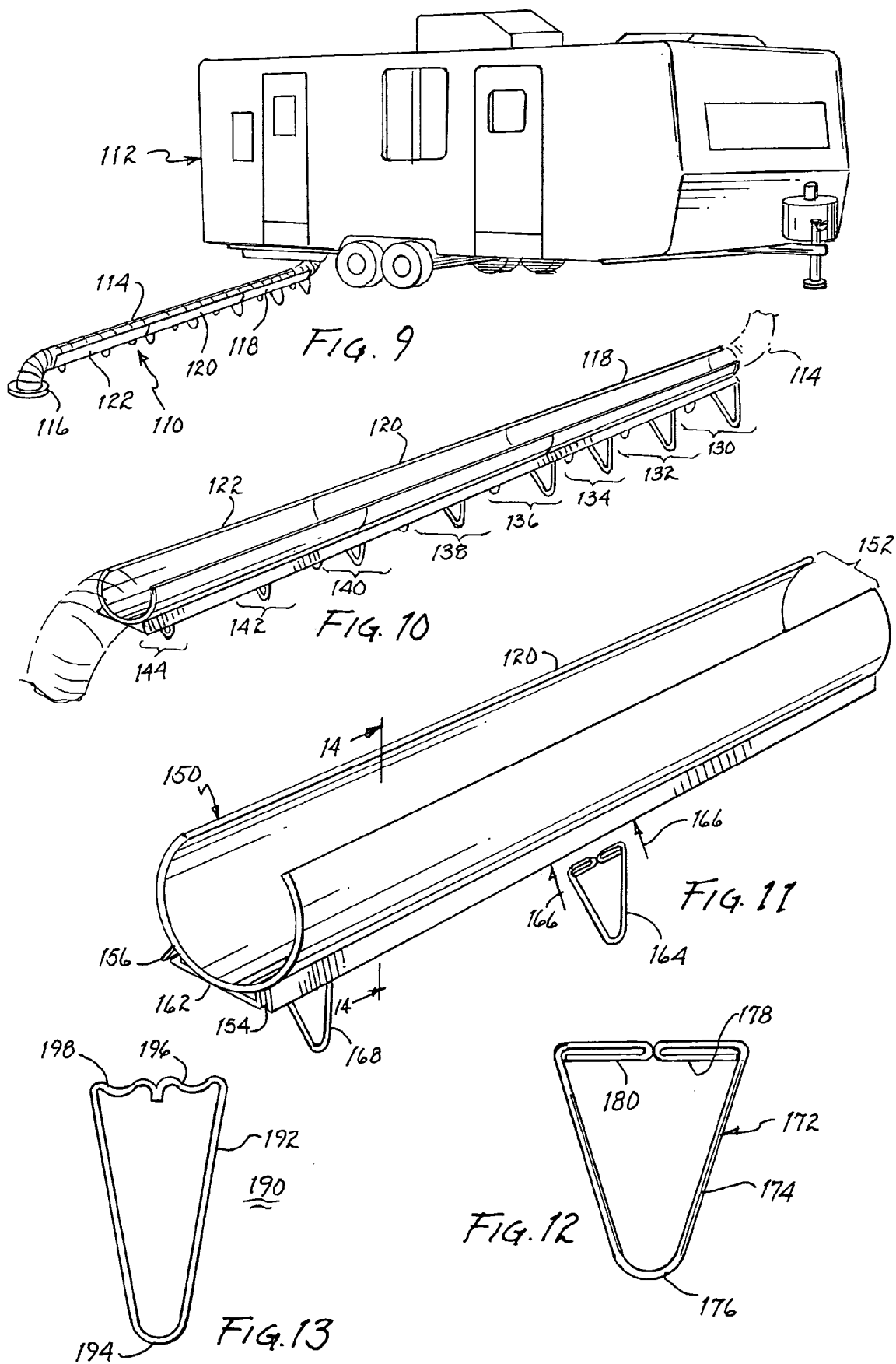

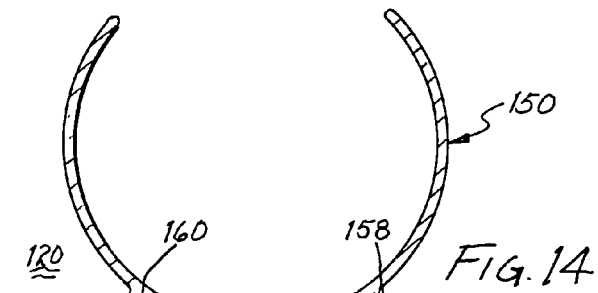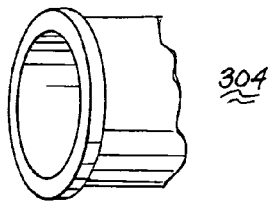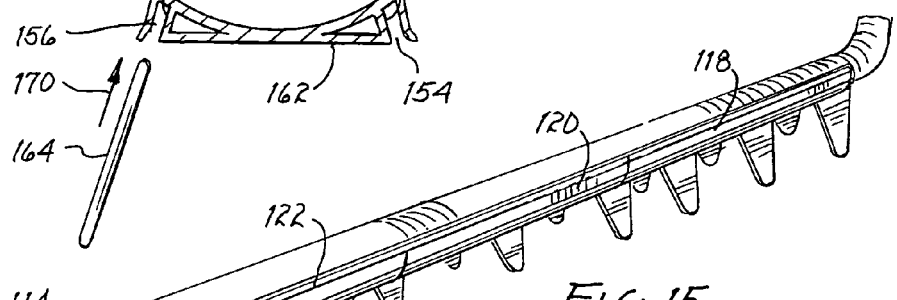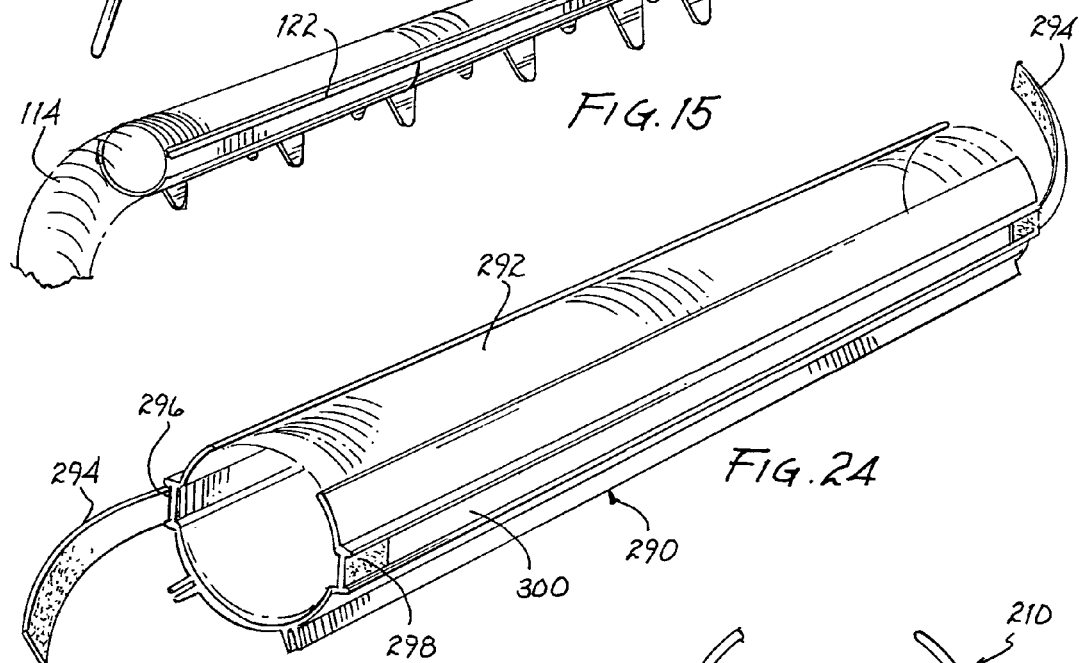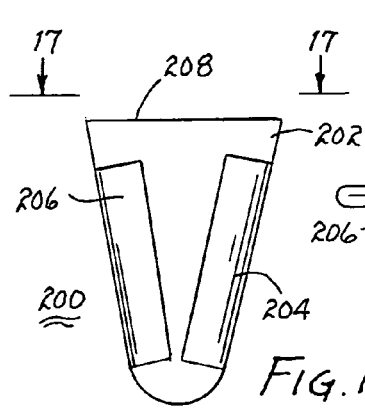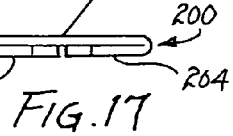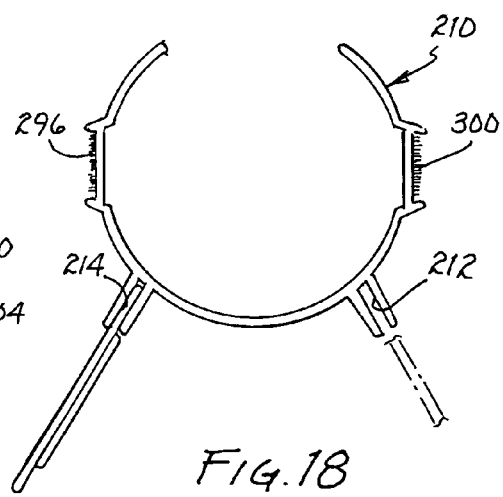

INCLINED SUPPORT FOR A DRAIN HOSE

BACKGROUND OF THE INVENTION

1. Field of the Invention

The present invention relates to inclined support systems and, more particularly, to supports for supporting a drain hose at an incline.

2. Description of Related Art

Recreational vehicles, whether trailers or motor homes, generally include a holding tank for wastewater. From time to time, the holding tank is drained to transfer the wastewater to an appropriate disposal facility. Should the recreational vehicle be parked at an RV park or the like drainage to the disposal facility may be on an ongoing basis.

Usually, drainage of the holding tank is accomplished by connecting a drain hose to the outlet of the holding tank, laying the drain hose on the ground and locating the outlet of the drain hose in fluid communication with the disposal facility. Most drain hoses used for this purpose are of an accordion-like construction to permit extension for use and compacting for storage purposes. The accordion-like construction provides a spiral groove within the drain hose that may retain quantities of fluid and solid matter. This problem is of particular concern when the drain hose rests upon an essentially horizontal surface. When the ground surface, and a drainage hose resting thereupon, slopes upwardly from the recreational vehicle to the disposal facility, a significant quantity of wastewater will be retained within the drain hose. Such wastewater, and any solids therein, will tend to putrefy as a function of the ambient temperature and quickly begin to smell. Furthermore, a health hazard may be created.

SUMMARY OF THE INVENTION

An inclined support system for a drain hose extending from a holding tank of a recreational vehicle conveys wastewater to a disposal facility. The support system includes one or more foldably compactable sawhorse-like supports having a cross member for supporting the drain hose. The opposed legs of the support include lower edges at an angle with respect to the cross member to incline the cross member a commensurate degree. The drain hose rests upon the cross member intermediate the upper ends of the legs. As weight is placed on the cross member by placing the drain hose thereupon, the upper ends of the legs will tend to cant toward one another. The degree of canting is limited by the exterior surface of the drain hose and thereby stabilizes the support during use and the cross member provides an inclined surface supporting the drain hose to promote flow of wastewater therethrough. In another embodiment, one or more partly cylindrical troughs laid end to end partly envelope the drain hose. A plurality of pairs of legs of descending length are removably inserted into opposed channels extending downwardly and outwardly from each trough. By inserting the pairs of legs into the channels in descending length order, the troughs will provide an inclined support for the drain hose to promote flow of waste water therethrough. Moreover, a trough will receive and retain the drain hose for storage purposes when the drain hose is longitudinally compressed.

It is therefor a primary object of the present invention is to provide an inclined support system for a drain hose to promote flow of wastewater therethrough.

Another object of the present invention is to provide a support for a drain hose which relies upon the drain hose for stability to support the drain hose at an incline to encourage flow of fluid through the drain hose.

Still another object of the present invention is to provide a support for a drain hose having a pair of legs pivotally secured to a cross member supporting the drain hose.

Yet another object of the present invention is to provide a dismantleable support for a drain hose.

A further object of the present invention is to provide a support for a drain hose, which support has pairs of legs exerting a force against opposed sides of the drain hose to provide rigidity to the support.

A still further object of the present invention is to provide a sawhorse-like support for a drain hose that uses the drain hose as a structural element to prevent collapse of the support.

A still further object of the present invention is to provide a plurality of pairs of legs of descending length slidably engageable with channels depending from a support for a drain hose that incline the support and promote fluid flow through the drain hose.

A yet further object of the present invention is to provide an inclined support for a drain hose having pairs of descending length legs pivotally attached to the support to promote flow of fluid through the drain hose.

A yet further object of the present invention is to provide an above ground inclined support for a drain hose that can contain the drain hose in a longitudinally compressed state for storage and transport.

A yet further object of the present invention is to provide a flexible partially cylindrical support for retaining a drain hose and supported by pairs of legs of descending lengths extending from channels acting to radially compress the support to firmly grip the retained drain hose.

A yet further object of the present invention is to provide a method for supporting a drain hose at an incline with a support.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a drain hose interconnected between a holding tank of a recreational vehicle and a disposal facility, which drain hose is supported by an inclined support system;

FIG. 2 is a perspective view of an inclined fixture shown in FIG. 1;

FIG. 2a illustrates a loop of elastic cord;

FIG. 3 is a perspective view showing the fixture in its collapsed state;

FIG. 4 is a partial cross sectional view of a leg interconnected with the cross member;

FIG. 5 illustrates a variant inclined support system;

FIG. 6 illustrates a cross sectional view taken along line 6-6, as shown in FIG. 5;

FIG. 7 is a side view illustrating the present invention in use;

FIG. 8 is a cross sectional view taken along line 8-8, as shown in FIG. 5;

FIG. 9 illustrates a further embodiment of a drain hose interconnected between a holding tank of a recreational vehicle and a disposal facility, which drain hose is supported by an inclined support system;

FIG. 10 illustrates the support system for the drain hose and the supporting descending length pairs of legs;

FIG. 11 is an isometric view of a support of the support system;

FIG. 12 illustrates an embodiment of a supporting leg;

FIG. 13 illustrates a further embodiment of a supporting leg;

FIG. 14 is a cross sectional view taken along lines 14-14, as shown in FIG. 11;

FIG. 15 illustrates a drain hose support system having differently configured pairs of supporting legs;

FIG. 16 illustrates a leg of the type shown in FIG. 15;

FIG. 17 is an end view taken along lines 17-17, as shown in FIG. 16;

FIG. 18 is an end view illustrating detachable attachment of the supporting legs shown in FIG. 16;

FIG. 24 illustrates storage of a drain hose within a support; and

FIG. 25 illustrates a representative cap for closing the ends of any of the supports described and illustrated to retain a drain hose therein.

DESCRIPTION OF THE PREFERRED EMBODIMENT

Figure 20:
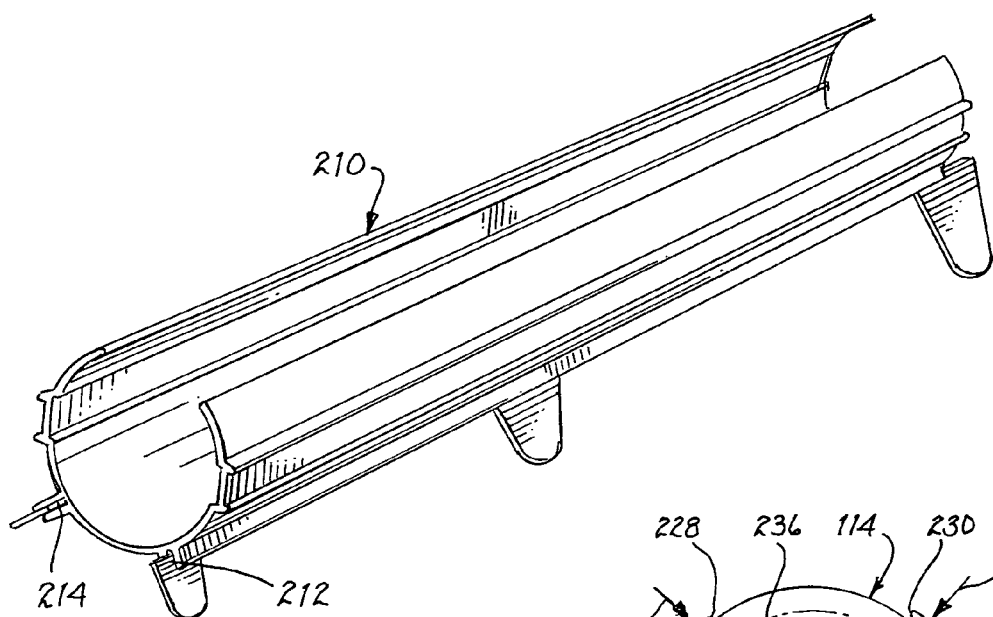
FIG. 20 is a further detail view of a support with three pairs of legs depending therefrom.

Referring to FIG. 1, there is illustrated a recreational vehicle 10, such as motor home. Recreational vehicles, whether motor homes or trailers, include a water tank for supplying water to be used for the normal purposes of drinking and washing. Additionally, the water tank provides water for flushing a toilet. A holding tank collects the resulting wastewater. Some recreational vehicles include two holding tanks wherein one is used to collect sewage prior to disposal and the other is used to collect wastewater. Each of these tanks must be drained from time to time. Most campgrounds and parks serving recreational vehicles include either a common disposal facility for receiving the outflow from holding tanks or a disposal facility may be associated with each rental space for a recreational vehicle. In the latter event, it is not uncommon to connect the holding tank(s) to the disposal facility and maintain such connection for the duration of the stay. Usually, the drain hose used lies on the ground, which ground may slope upwardly or downwardly from the recreational vehicle to the disposal facility. In the former case, the wastewater and any particulate matter therein will pool in the drain hose and become putrefied generally as a function of the ambient temperature. The resulting smell may quickly become overbearing. Furthermore, such pooling is exacerbated by the structural configuration of the conventionally used drain hose. That is, the drain hose is generally of a vinyl type plastic conduit supported by a spiral wire. A spiral groove is formed in the drain hose which will collect and retain wastewater and particulate matter unless the drain hose is inclined downwardly at a certain minimum angle to the disposal facility.

To eliminate the vagaries attendant flow of wastewater to a disposal facility at a campground or park, an inclined support system 12 may be employed, as shown in FIG. 1. Drain hose 14 is secured to a holding tank within recreational vehicle 10 in the conventional manner (not shown). Outlet 16 of the drain hose is attached to a disposal facility represented by conduit 18. A coupling 20, such as the 90 degree coupling illustrated, may be used to interconnect outlet 16 of the drain hose with the conduit. Inclined support system 12 may include one or a plurality of legs or fixtures, such as fixture 22 and one or more further fixtures 24; these fixtures are similar in configuration and function but different in size (height) and will be described in further detail below.

Fixture 22, shown in FIGS. 2, 3 and 4, is similar to a sawhorse in that it incorporates a pair of legs 26, 28 interconnected by a cross member 30. The material of the fixture may be of a plastic sheet, a wooden sheet or a metal sheet. A material found particularly suitable is a corrugated plastic sheet material readily available from various wholesale and retail outlets. Leg 26 is formed of a first panel 32 folded against and secured to panel 34. Panel 36 is folded from panel 34 across edge 38 of panel 32 and placed adjacent and secured to panel 32, as particularly illustrated in FIG. 4. Cross member 30 includes a panel 40 folded from panel 36 and a further panel 42 folded from panel 40. Leg 28 is constructed similarly to leg 26. That is, leg 28 includes a panel 44 similar to panel 32 and folded against and secured to panel 46, which corresponds with panel 34. Panel 48 extends from panel 46 and is folded about edge 50 of panel 44 adjacent and secured to panel 44; panel 48 corresponds with panel 36. Panel 48 is in folded engagement with panel 42 of cross member 30. From the above description it becomes evident that the panels of fixture 22 are folded from a single sheet of material; however, single panels corresponding with legs 26, 28 and cross member 30 may be used. To insure the possibility of placing the fixture in a compact state for storage purposes, the cross member should fold as described and the cross member should be in foldable engagement with legs 26, 28. It may also be noted that the plurality of panels forming each of legs 26, 28 provide significant strength from the corrugated plastic sheet material. Depending on the sheet material used, less than the number of panels per leg described and illustrated may be used. Moreover, the cross member may be hingedly or otherwise pivotally attached to one or both of the legs; the panels of the cross member may be hingedly or otherwise pivotally attached to one another.

As particularly shown in FIGS. 2, 2a and 3, a loop 60 of elastic cord is formed by tying the ends of the cord into a knot 62. An aperture 64, shown in FIG. 3, is formed in leg 28 to penetrably receive loop 60 with the loop being drawn therethrough until knot 62 comes into interfering engagement with aperture 64 to lodge the knot thereagainst. Edge 66 of leg 26 includes a pair of slots 68, 70 to define a tab 72. Edge 80 of leg 28 includes a pair of slots 74, 76 to define a tab 78. The end of loop 60 is disengagably engageable with both tabs 72 and 78 to retain the panels adjacent one another.

FIG. 2 illustrates fixture 22 in the expanded state ready to receive and support a drain hose (as shown in FIG. 1). FIG. 3 illustrates fixture 22 in the collapsed or compact state for storage, shipment and for other purposes. In the collapsed state, panels 40, 42 of cross member 30 are folded adjacent one another to place them intermediate and adjacent with panels 48, 36, (or legs 26, 28) respectively. Such folding places legs 26, 28 essentially adjacent one another as illustrated. As particularly shown in FIG. 1, loop 60 extends about drain hose 14 and is secured to tab 72 to retain the drain hose upon cross member 30 and intermediate panels 36, 48 of legs 26, 28, respectively. In the compact state, shown in FIG. 3, loop 60 engages tabs 72, 78 to retain fixture 22 in the collapsed state.

To provide an incline for drain hose 14 supported upon fixture 22, edges 66, 80 of legs 26, 28, respectively, are angled toward edges 82, 84 of legs 26, 28, respectively, in the direction of arrow 86. Thereby, the elevation of cross member 30 is lower at the pointed end of the arrow than the elevation of the cross member corresponding with the other end of the arrow. The cross member, being inclined, provides an inclined support for drain hose 14 to encourage flow of fluid and particulate matter therethrough.

As illustrated in FIG. 1, drain hose 14 is supported directly upon fixtures 22 and 24. Storage of a conventional drain hose used for evacuating a holding tank of a recreational vehicle is often a problem due to the flexible nature of the hose and the fact that retaining it longitudinally compressed is awkward at best. To avoid this problem, a trough 90 may be used, as shown in FIGS. 5, 6, 7 and 8. The trough is of a length commensurate with the length of the drain hose in its longitudinally compressed state. To retain the hose within the trough for storage and other purposes, a plurality of interlocking straps of the hook and loop type (sometimes sold under the trademark Velcro) extending from the trough and wrapped about the drain hose may be employed.

In operation, trough 90 may be placed in fixture 22, as shown in FIG. 6, to rest upon cross member 30 and intermediate the upper ends 100, of legs 26, 28, respectively. Loop 60 is used as described above to retain drain hose 14 and trough 90 in the fixture. In operation, straps 92, 94 are released from one another to permit extension of the drain hose, as shown in FIG. 7, to interconnect the ends of the drain hose with outlet 96 of a holding tank in a recreational vehicle and with a conduit 18 attendant a waste disposal facility. It is to be appreciated that the length of trough 90 is primarily a function of the longitudinally compressed length of the drain hose supported therein.

FIGS. 5 and 7 particularly illustrate fixture 24. Fixture 24 is identical in construction and configuration with fixture 22 accept that it is of much lesser length. This reduced length provides several advantages. First, storage of the much smaller fixture 24 is easier as the amount of volume needed for storage is significantly reduced, including a reduction in the length requirements of such storage location. Depending upon the length of the run of drain hose 14, one fixture 24, a pair of fixtures (as shown in FIG. 5), three fixtures (as shown in FIG. 7) or more fixtures may be used to provide an inclined support for the drain hose. To ensure such inclined support, the plurality of fixtures 24 would be configured of descending height and inclined in the direction of arrows 86, as illustrated with particularity in FIG. 7. The spacing between fixtures 24 would be a function of the relative longitudinal rigidity of drain hose 14 in order to minimize droop between the fixtures. The use of trough 90 in the alternative eliminates such droop irrespective of the spacing between the fixtures, provided only that at least two of the fixtures support the trough.

As described above, each of fixtures 22, 24 is formed of a pair of legs pivotally or foldably engaged with one another through a further pair of pivotable/foldable panels of a cross member. By dimensioning the lateral dimension of the cross member to be greater than the diameter of the drain hose, the cant or splay of legs 24, 28 relative to one another in the operative configuration is dictated by the diameter of the supported drain hose. That is, when weight is placed upon the cross member, lower edges 66, 80 of the legs will tend to be splayed apart from one another unless restrained. Such restraint is provided by the drain hose itself due to upper ends 100, 102 bearing against the drain hose or against trough 90 when used. Thereby, no further structural members are necessary to permit the fixtures to provide rigid support for the supported drain hose and the fixture is rigid in the dynamic mode.

A further embodiment of an inclined support system 110 is shown connected to a waste water tank within a recreational vehicle, such as trailer 112. A drain hose 114 may be directly connected to a waste disposal inlet 116, as shown. Alternatively, the drain hose may include an outlet connected to a coupling for engagement with a conduit associated with a waste disposal facility, as shown in detail in FIG. 1. Inclined support system 110 may include three supports 118, 120 and 122, as illustrated. Each of these supports includes a plurality of pairs of legs of descending length from trailer 112 to waste disposal inlet 116. Thereby, each of the supports is at an incline and the totality of supports presents a continuous incline. Drain hose 114, resting within the plurality of supports is at a commensurate incline to encourage the flow of waste water from trailer 112 to waste disposal inlet 116.

Referring jointly to FIGS. 10, 11, 12, 13 and 14, details attendant each support will be described. A pair of legs 130 extend downwardly and outwardly from the upper end of support 118. Further pairs of legs 132, 134 are of descending length and extend downwardly and outwardly from support 118. Thereby, these three pairs of legs position support 118 at a downward incline from trailer 112. A further pair of legs 136 may extend from the upper end of support 120 or this pair of legs may extend from the junction between support 118 and 120 to mechanically connect these two supports with one another. Further pairs of legs 138, 140 extend downwardly and outwardly from support 120, which pairs of legs are of descending length to continue with the incline set by support 118. As with pair of legs 136, pair of legs 140 may be attached at the junction between supports 120 and 122 to mechanically engage the supports with one another. Further pairs of legs 142, 144 (one leg of which pairs are not shown because they are too short to be viewed in FIG. 10) These pairs of legs are also of descending length to place support 122 at an incline which is an extension of the incline represented by supports 118 and 120. With these multiple pairs of legs of descending length from the trailer to the waste disposal inlet, drain hose 114 supported thereby is at an incline to encourage flow of wastewater therethrough.

Referring particularly to FIGS. 11, 12, 13 and 14, details attendant support 120, representative of each of the supports, will be described in further detail. Support 120 includes a partial cylindrical element 150 having a slot at the upper center. A channel 154 is formed along cylindrical element 150 on one side of the vertical center. A similar channel 156 is formed as a mirror image on the other side of the cylindrical element. For robustness and other purposes which will be discussed below, inner sides 158, 160 of channels 154, 156, respectively, are joined by a plate 162 formed as part of cylindrical element 150. The purpose of channels 154, 156 is that of slidably receiving and retaining the pairs of supporting legs. As shown in FIG. 11, a leg 164 of a pair of legs (such as pair of legs 138) is slid into channel 154, as represented by arrows 166. At a distance removed from leg 164 there is illustrate a leg 168 lodged in place within channel 154. As discussed above, the length of leg 164 is greater than the leg 168 to provide the above discussed incline to support 120. As particularly shown in FIG. 14, leg 164 of a pair of legs is slidably inserted into channel 156, as represented by arrow 170.

Preferably, each of the legs, such as leg 172, shown in FIG. 12, is formed into a triangular configuration by a length of wire 174. As illustrated, leg 172 is generally in the shape of an isosceles triangle with a rounded bottom apex 176. At the base of the triangle (upper part), the ends 178, 180 of wire 174 may be folded back upon themselves to establish a relative degree of robustness. Splaying of the sides of the isosceles triangle represented by leg 172 is prevented by selecting wire 174 of an appropriate modulus of elasticity.

A further embodiment of a leg 190 is illustrated in FIG. 13. This leg is also formed from a length of wire 192 bent into essentially an isosceles triangle and having a rounded apex 194. Upper ends 196, 198 of wire 192 may be bent into a convoluted form, as illustrated, with the terminal ends in contact with one another. Alternatively, the terminal ends may be mechanically secured to one another by welding or the like. The convoluted shape of ends 196, 198 add to robustness to the retained upper end of leg 190.

Referring jointly to FIGS. 15, 16 and 17, a variant of the legs supporting one or more of supports 118, 120 and 122 will be described. A plurality of pairs of these variant legs extend from the respective supports and are of descending length from the trailer to the waste disposal inlet, as described above in detail with respect to FIG. 10. Each of variant legs 200 is formed from a sheet 202 of plastic or the like. Extensions 204, 206 extending from the sides of the isosceles triangular shape of variant leg 200 are folded to provide a double thickness, as shown in FIG. 17. Such double thickness will add to the robustness of each of the variant legs. These folded over extensions extend short of to upper edge 208 of the variant leg whereby the upper edge may be removably lodged in a respective one of the channels of a support, as discussed above with respect to FIG. 11.

Figure 19:
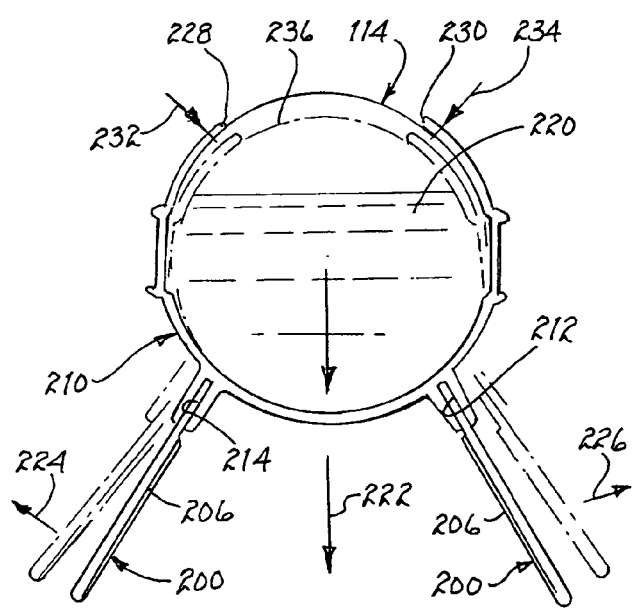
FIG. 19 illustrates the gripping action of the support upon a contained drain hose as a result of an increased weight of the drain hose due to fluid flowing therethrough.

As particularly shown in FIGS. 18, 19 and 20, a variant support 210 is illustrated, which includes a pair of channels 212, 214 extending downwardly and outwardly. Legs, such as legs 200 shown in FIGS. 16 and 17 may be joined with these channels by inserting edge 208 into the channels until extensions 204, 206 bear against the opening edges of the channels. As particularly illustrated in FIG. 19, support 210 does not include a plate 162 (as shown in FIG. 14). When drain hose 114 becomes partially filled with waste water 220, the resulting weight will exert a downward force upon the support, as depicted by arrow 222. This weight may cause legs 200 to splay outwardly, as depicted by arrows 224, 226. Such outward splaying of these legs with commensurate movement of channels 212, 214 will cause upper edges 228, 230 of support 210 to bend radially inwardly, as depicted by arrows 232, 234. The resulting movement of the edges of support 210 will tend to compress drain hose 114 therein, as depicted by dashed line 236. Thereby, support 210, along with adjacent supports, will firmly grip the drain hose to prevent longitudinal movement thereof.

Figure 21:
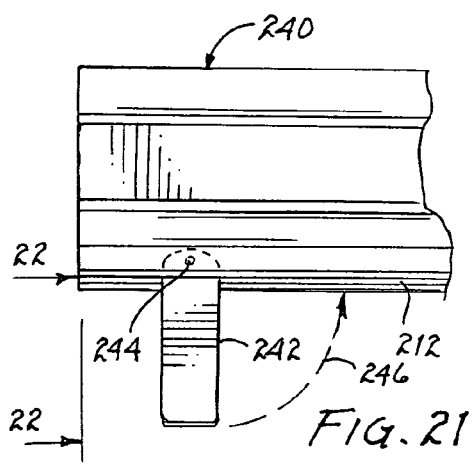
FIG. 21 illustrates a support having a pivotally attached leg.
Figure 22:
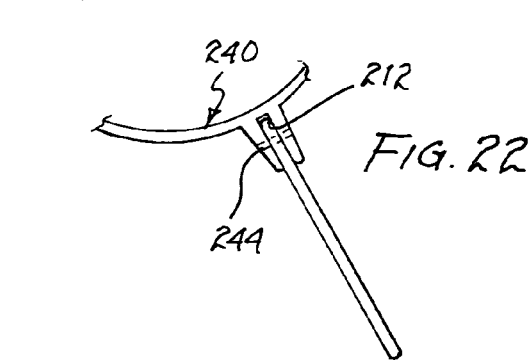
FIG. 22 is an end view taken along lines 22-22, as shown in FIG. 21.

Referring jointly to FIGS. 21 and 22, there is shown a further variant of the legs. Support 240 includes channels 212 and 214 (not shown) similar to the channels shown in FIG. 20. A leg 242 is pivotally secured to channel 212 by a pin 244 pivotally securing the leg within the channel. During non use of support 240, leg 242 may be pivoted upwardly, as depicted by arrow 246 until the length of the leg engages and is retained by channel 212. It is to be understood that these pivoting legs extending from support 240 are of descending length to insure an incline of support 240 when in use.

Figure 23:
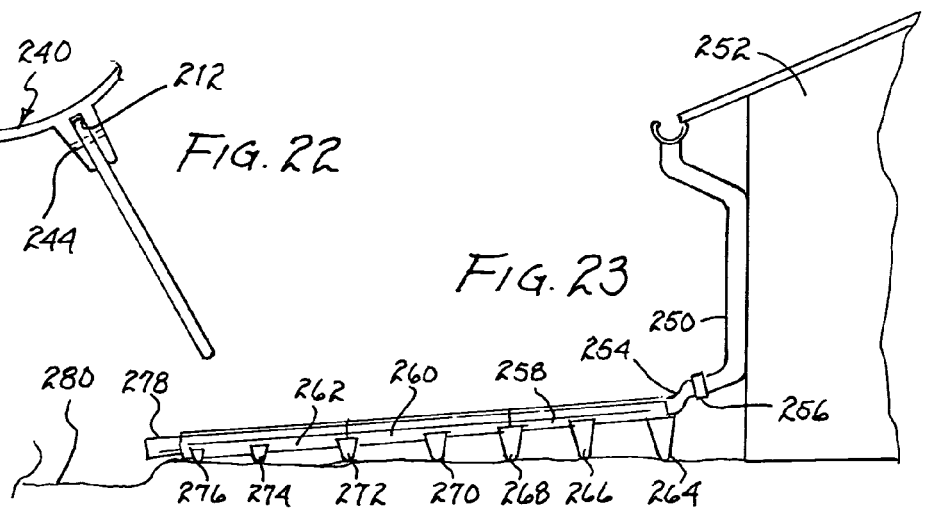
FIG. 23 illustrates one of many alternative uses of the present invention and wherein the present invention is used to convey water from a drain of a roof.

Aside from use of the present invention in conjunction with the discharge of waste water, it may be used for a number of other purposes to convey water or other fluid from one location to a lower location. As depicted in FIG. 23, one such use may be that of conveying water from a downspout 250 of a house or other structure 252. Herein, a hose 254 is attached to the downspout by a coupling 256 or the like. The hose rests upon a plurality of supports, such as supports 258, 260 and 262. Each of these supports is located at a downward incline from downspout 250 by descending lengths of a plurality of pairs of legs 264, 266, 268, 270, 272, 274 and 276. Outlet 278 drains the outflow of water into a catch basin 280 or the like.

Storage of a drain hose used in conjunction with disposal of wastewater from a recreational vehicle is generally achieved by inserting the hose into a hollow square rear bumper of the vehicle. While this storage system is clearly operative, it is less than optimal. Referring to FIG. 24, there is illustrated a more elegant capability for storing a drain hose. A support 290 is configured to receive a drain hose 292, as discussed and illustrated above. Typically, these drain hoses are longitudinally compressible to a length approximately one third of their normal stretched length. In a system, such as illustrated in FIG. 10 or 15 incorporating three supports, one of these supports may be used for storage of the drain hose. As support 290 and the supports discussed above, form a slotted cylinder having edges extending past the horizontal midpoint, a drain hose placed therein must be inserted and removed through one end or another as it cannot be easily lifted laterally out of the support. By compressing drain hose 292 within the length of support 290, as illustrated in FIG. 24, the support retains the full length of the drain hose. To maintain it in place, a strap of the hook and loop type of closure device is adhered or otherwise secured within a channel 296 on one side of support 290. The other element 298 of the hook and loop device is adhered or otherwise secured within a further channel 300. By bringing strap 294 across the end of support 290, hose 292 is prevented from being withdrawn from this end. A similar strap 294 and corresponding element is attached to channel 300, 296, respectively, at the other end of the support. Thus, the drain hose is prevented from being withdrawn from the other end of the support.

As an alternative closure for a support, a cap, such as cap 304 shown in FIG. 25, may be used. This cap is insertable in each of the ends of a selected support for housing the drain hose. Presently, the preferred embodiment of the various supports shown and described is support 120 shown in FIG. 11. It provides the necessary rigidity for the depending legs. Moreover, the use of plate 162 prevents the support from rolling when in storage or during transport. It also eliminates the expense of forming channels 296 and 300, as shown for support 290 in FIG. 24. Irrespective of which support is used, cap 304 may be lodged in each end to retain a compressed drain hose therewithin.

I claim:

1. An inclined support system, said support system comprising:
   a) a longitudinally slotted cylindrical support (150) adapted for supporting a drain hose, said slotted cylindrical support (150) including an upwardly oriented slot (152) for receiving and supporting the drain hose (114) within said cylindrical support;
   b) a pair of splayed channels (154, 156) formed as part of and extending downwardly from and along said cylindrical support (150); and
   c) each leg of a plurality of detachably attached pairs of legs (164) being attachable to and extendable from within a channel of said pair of splayed channels (154, 156) for supporting said cylindrical support, each pair of legs of said pairs of legs (164) being of descending length to place said cylindrical support at an incline.

2. The support system as set forth in claim 1 wherein said pair of channels (154, 156) orient each pair of said pairs of legs (164) in a splayed configuration.

3. The support system as set forth in claim 1, including a plurality of said cylindrical supports placed end to end to form an extended cylindrical support, said plurality of pairs of legs (164) extending from respective ones of said cylindrical supports to place said extended cylindrical supports at an incline.

4. An inclined support system, said support system comprising:
   a) a longitudinally slotted cylindrical support (210) adapted for supporting a drain hose, said slotted cylindrical support (210) including an upwardly oriented slot (152) for receiving and supporting the drain hose (114) within said cylindrical support;
   b) a pair of splayed channels (212, 214) formed as part of and extending along said cylindrical support (210) and away from said slot (152); and
   c) each leg of a plurality of pairs of legs (206, 206) being pivotally attachable to and extendable from within one channel of said pair of splayed channels (212, 214) for supporting said cylindrical support (150), each pair of legs of said pairs of legs (206, 206) being of descending length to place said cylindrical support (150) at an incline.

5. The support system as set forth in claim 4 wherein said pair of channels (212, 214) orient each pair of said pairs of legs (206, 206) in a splayed configuration.

6. The support system as set forth in claim 4, including a plurality of said cylindrical supports (258, 260, 262) placed end to end to form an extended cylindrical support, said plurality of pairs of legs (264, 266, 268, 270, 272, 274, 276) extending from respective ones of said cylindrical supports to place said extended cylindrical support at an incline.

7. The support system as set forth in claim 4 including a plurality of pins (244), each of said pins pivotally supporting one of said legs from the respective one of said channels.

* * * * *